Aug. 10, 1965
D. BUCCICONE
3,199,654
MAGNETIC CONVEYOR
Filed May 14, 1962
4 Sheets-Sheet 1
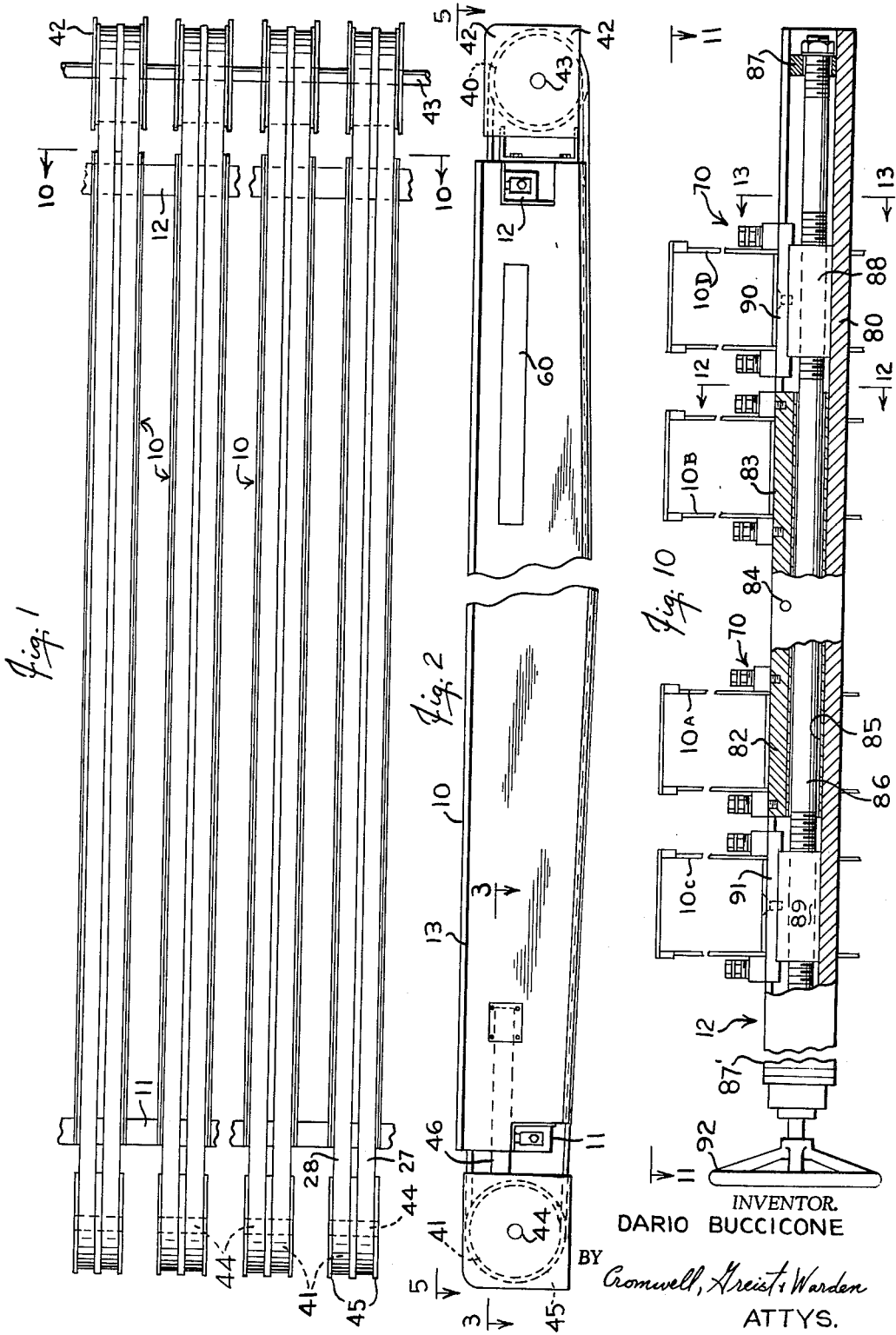
INVENTOR.
DARIO BUCCICONE
BY Cromwell, Greist & Warden
ATTYS.

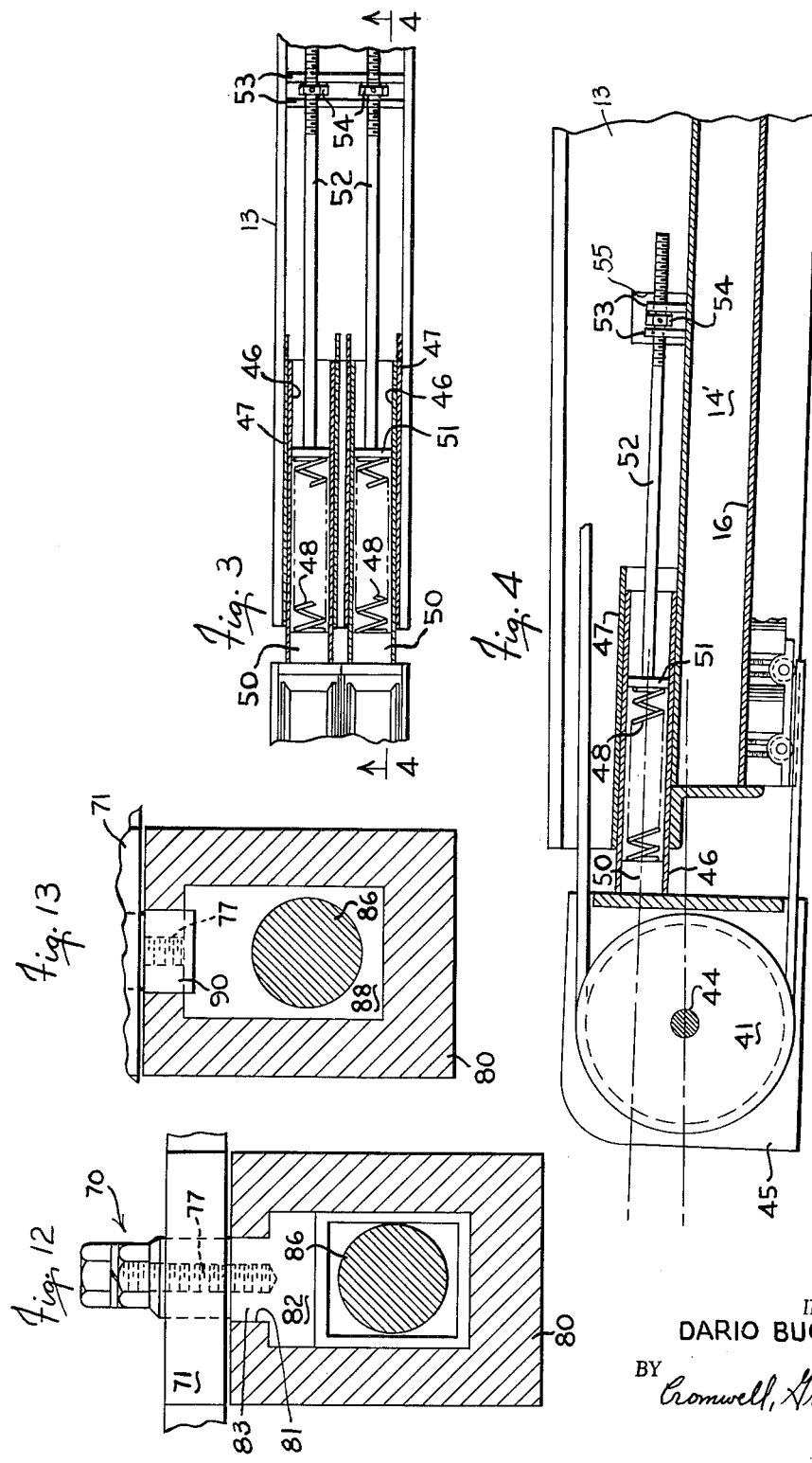

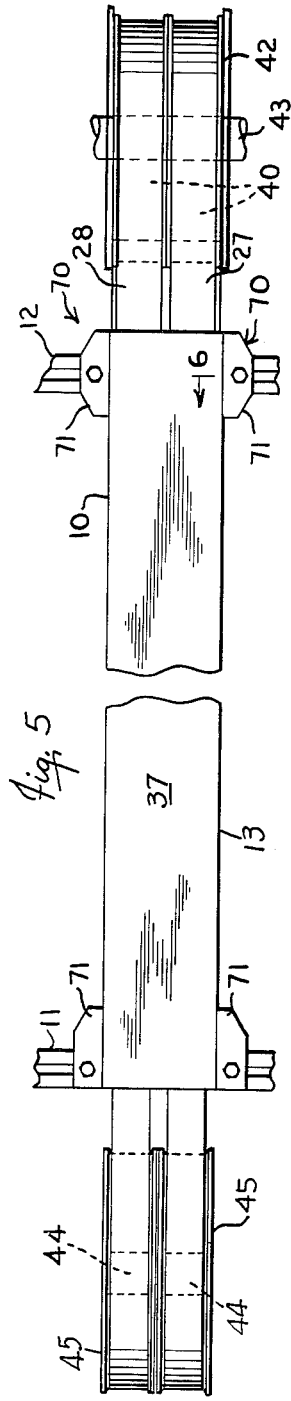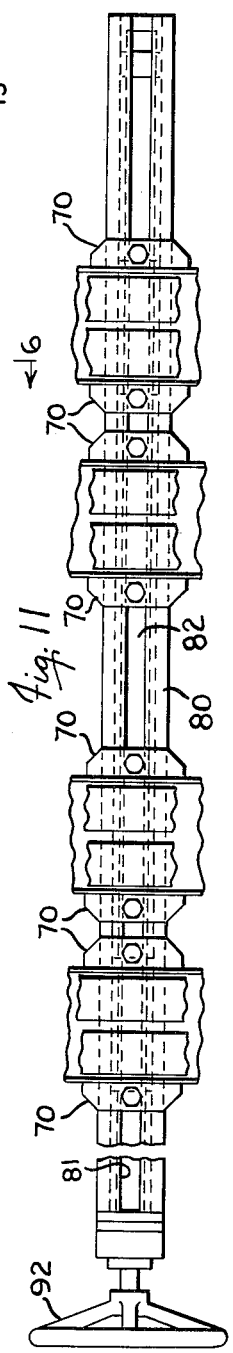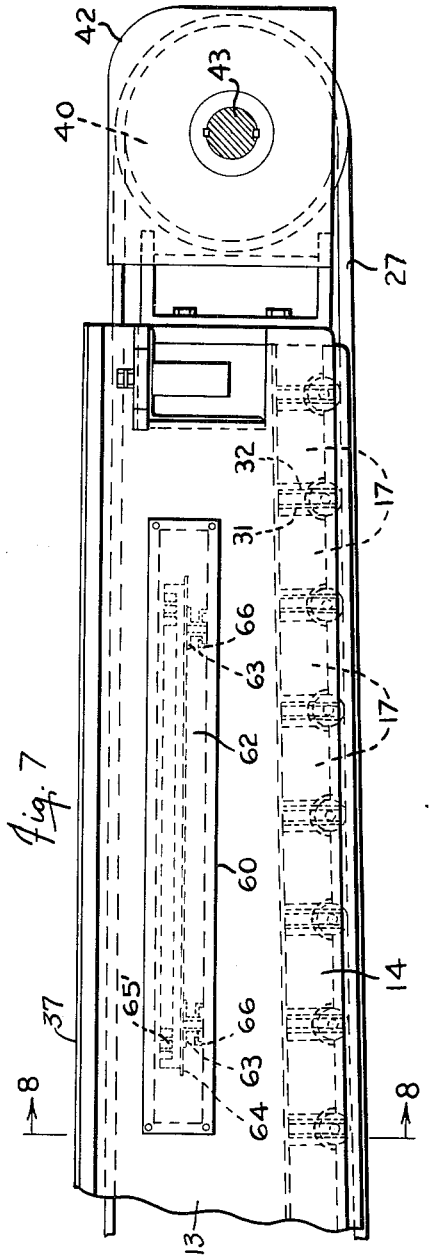

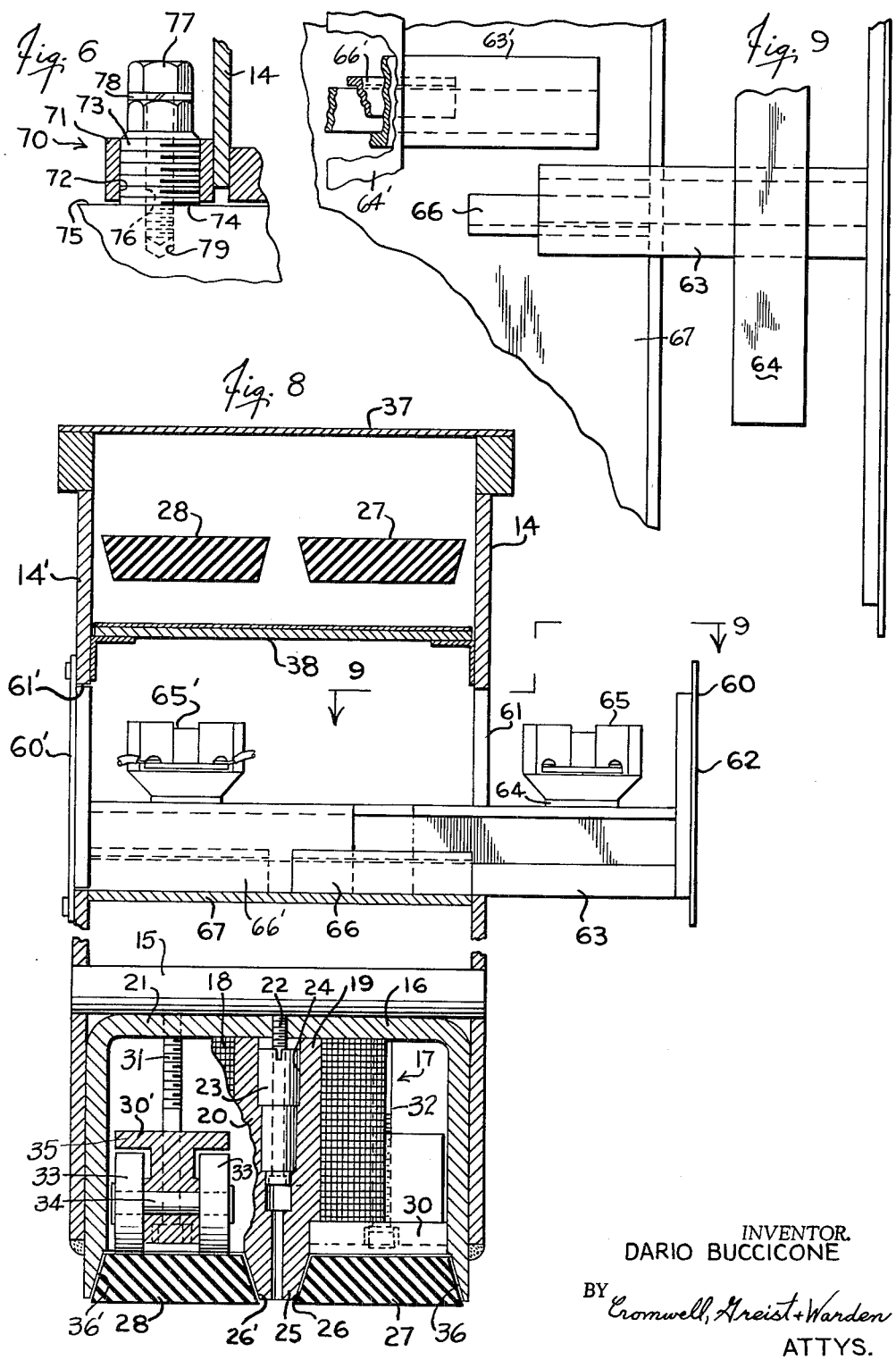

United States Patent Office 3,199,654
Patented Aug. 10, 1965

3,199,654
MAGNETIC CONVEYOR
Dario Buccicone, Gary, Ind., assignor to Bucciconi Engineering Co., Inc., Gary, Ind., a corporation of Indiana
Filed May 14, 1962, Ser. No. 194,510
4 Claims. (Cl. 198—41)

This invention relates to article conveyors and is more particularly concerned with improvements in an overhead conveyor of the type which employs electromagnets for holding metal sheets or similar articles against the bottom surface of one or more traveling belts.

Conveyors of the rail type have theretofore been developed which rely on magnetic force for holding sheets of steel or similar material against the bottom surface of one or more traveling belts as shown, for example, in my Patents No. 2,374,174, dated April 24, 1945, and No. 2,600,475, dated June 17, 1952. These prior devices have been highly successful in the handling of various kinds and sizes of sheets and in many different situations. However, the rail units as heretofore constructed have been found to have some disadvantages and it is an object of the present invention to improve the construction and mounting of the rails so as to increase their efficiency and versatility in use.

It is a more specific object of the invention to provide a rail-type conveyor unit comprising an elongate frame having a series of electromagnets mounted in the lower face thereof which are operative to hold sheet materials against the bottom surface of one or more endless traveling belts which are supported at one end of the frame on end pulleys which are in fixed position on the frame and at the other end of the frame on idler pulleys which are slidably mounted on the frame and spring urged to tension the belt, the lower face of the conveyor unit being curved to correspond to a predetermined sag of the belt between the pulleys and the idler pulleys being carried on individual supporting frames each having a portion which is slidable in a guideway formation in the end of the conveyor frame and the longitudinal axis of the guideway being inclined downwardly towards the center of the conveyor frame so as to be approximately parallel with the adjacent end section of the belt whereby the pulley frame is urged by its spring in a direction to draw the end section of the belt upwardly against the frame.

Another object of the invention is to provide in an elongate rail-type electromagnetic conveyor unit a slidably mounted tray for supporting the electrical terminal blocks for the coils of the electromagnets with the tray being normally seated in a recess adjacent the end of the rail frame and being slidable laterally of the frame so as to provide ready access to the terminal blocks.

A further object of the invention is to provide a rail-type electromagnetic conveyor which is supported at its opposite ends on cross bar support members and which has special provision for leveling the rail unit at the ends on the supports so as to improve the operation of the rail unit and facilitate alignment when a number of the rail units are employed.

A still further object of the invention is to provide a conveyor of the type described which comprises a plurality of rail units disposed in parallel relation on end supports with provision for adjusting the lateral spacing of the rails by moving the outside rails simultaneously toward and from one or more fixed center rails.

These and other objects and advantages of the invention will be apparent from a consideration of the apparatus which is shown by way of illustration in the accompanying drawings wherein:

FIGURE 1 is a plan view of an electromagnetic conveyor having a plurality of rail-type conveyor units, with portions broken away and other portions omitted;

FIGURE 2 is a side elevation of the conveyor shown in FIGURE 1, with portions broken away;

FIGURE 3 is a cross section taken on the line 3—3 of FIGURE 2, to an enlarged scale and with portions broken away or omitted;

FIGURE 4 is a sectional view taken on the line 4—4 of FIGURE 3;

FIGURE 5 is a plan view showing a single rail unit, the view being taken on the line 5—5 of FIGURE 2 with portions thereof broken away or omitted;

FIGURE 6 is a fragmentary section taken on the line 6—6 of FIGURE 5, to an enlarged scale;

FIGURE 7 is an elevation of an end portion of one of the rail units, to an enlarged scale;

FIGURE 8 is a cross section taken on the line 8—8 of FIGURE 7, to an enlarged scale;

FIGURE 9 is a fragmentary section taken on the line 9—9 of FIGURE 8;

FIGURE 10 is a cross section taken on the line 10—10 of FIGURE 1, to an enlarged scale;

FIGURE 11 is a fragmentary plan view taken on the line 11—11 of FIGURE 10;

FIGURE 12 is a cross section taken on the line 12—12 of FIGURE 10, to a larger scale; and FIGURE 13 is a cross section taken on the line 13—13 of FIGURE 10, to a larger scale.

Referring first to FIGURES 1 and 2, there is illustrated an overhead magnetic conveyor for sheet materials which comprises four elongate rail units 10 which are mounted on end cross supports 11 and 12, with the latter forming part of end structures (not shown) at opposite ends of the conveyor which are generally in the form of upright supporting frames. The rail units 10 are of identical construction and only one thereof will be described in detail.

Each rail unit 10 (FIGURES 2, 5 and 8) comprises an elongate frame 13 of rectangular cross section which is formed by a pair of side plates 14 and 14' disposed in parallel, laterally spaced, vertical planes. The side plates 14 and 14' are connected by suitable longitudinally spaced cross bars 15 and a downwardly opening magnet housing 16 is mounted in the bottom face thereof. A plurality of longitudinally spaced electromagnet assemblies 17 are mounted in the housing 16 with each of the assemblies including a coil member 18 mounted on the stem portion 19 of a T-shaped core member 20 which is fastened to the top wall 21 of the magnet housing 16 by a bolt 22 which extends through a tubular mounting sleeve 23 secured in a bore 24 in the core member so that the bolt head is trapped within a pocket in the core and is accessible to a turning tool through a portion of the bore which extends through the bottom portion of the core member and is of reduced diameter. The cross head forming bottom portion 25 of the core member 20 is in the form of an elongate bar which extends longitudinally of the conveyor unit and has its side edges beveled at 26 and 26' to conform to the inner edges of a pair of traveling belts 27 and 28. The belts 27 and 28 are seated against the lowermost faces of longitudinally extending belt guide plate assemblies 30 and 30' which are arranged along opposite sides of the bottom core member 25. The guide plate assemblies 30 and 30' comprise relatively short sections each suspended in the housing 16 by one or more hanger bolts 31, the latter having their upper ends engaged in threaded apertures in the top wall 21 of the housing 16. Each belt guide section 30, 30' (FIGURE 8) is provided with one or more bolts 32 which are disposed parallel with the hanger bolts 31 and which have a screw threaded connection with the guide plate at the lower end while the upper end thereof bears against the bottom face of the top wall 21 of the magnet housing 16 so as to permit adjusting the elevation of each individual guide plate section. Each belt guide section has one or more pairs of rollers 33 mounted on a cross pin 34 and in recesses provided in the side walls of a housing forming section 35 thereof on which the belts ride. The bottom edges of the side walls of the magnet housing 16 are beveled at 36 and 36' to conform to the outside edges of the belts 27 and 28. The belt guides or riders 30 and 30' are adapted to be adjusted by the bolts 31 and 32 so that the belts 27 and 28 are supported along the length of the curved bottom face of the conveyor frame. The two side plates 14 and 14' of the conveyor frame are connected at the top by a cover plate 37 and an inner cross frame plate 38 may be provided.

The belts 27 and 28 are supported at opposite ends of the frame 13 on individual pulleys 40 and 41 (FIGURES 1 and 2). The end pulley 40 is supported in fixed position relative to the frame in a bracket forming member 42 which is secured at the end of the main frame and is connected to a drive shaft 43 extending crosswise of the machine. The pulley 41 at the other end of the frame 13 is a belt tensioning idler which is mounted on a small shaft 44 journaled in a bracket-like supporting frame 45 having a specially designed sliding connection with the main frame. The bracket frame 45 is supported on the outer end of a hollow tubular stem forming member 46 (FIGURES 3 and 4) which is received in sliding relation in a guideway forming housing 47 secured in the end of the frame 13. The guideway housing 47 extends longitudinally of the conveyor frame 13 and is arranged with its longitudinal axis downwardly inclined relative to the longitudinal axis of the conveyor frame 13 or to a horizontal plane passing through the axes of the pulley supporting shafts 43 and 44. The angle of inclination of the axis of the guideway housing 47 relative to the longitudinal axis of the main frame is such that the pulley bracket 45 moves generally parallel with the belt section at the end of the conveyor frame and exerts an upward pull on the belt, thereby holding the belt tight against the supporting guide plates or shoes 30 and 30' at the end of the conveyor so as to obtain maximum pull on the sheet at the end of the conveyor by holding the sheet to a minimum distance from the pole pieces 24 of the end magnet assemblies. A compression spring 48 is received in the tube 46 with its one end seated against a fixed block 50 in the outer end of the tube 46 and with its other end seated against the head of an adjusting screw 52 extending longitudinally of the frame 13. The screw 52 has its opposite end slidable in aligned slots provided in a pair of transversely extending cross bar members or bracket plates 53 and carries a nut 54 between the bar member or plates 53 which has tool receiving apertures in its peripheral edge so as to permit rotation thereof by a tool inserted through an aperture 55 in the adjacent side wall of the main frame. With this arrangement the nut 54 may be turned on the bolt 52 to increase the compression in the spring 48 which exerts an outward and upward pull on the end section of the belt so as to draw the belt tightly against the bottom of the conveyor frame for maximum pull by the end magnets on a sheet carried on the belts.

At the other end of each conveyor rail unit 10 two tray formations 60 and 60' (FIGURES 7, 8 and 9) are mounted in sliding relation in the conveyor frame above the magnet assemblies 17 so as to be moved outwardly through openings 61 and 61' in the frame side walls 14 and 14'. The tray 60 comprises an outer face or cover forming plate member 62 and a pair of spaced slides 63 in the form of oppositely facing channels which extend normal thereto adjacent the bottom edge and which are connected by a top plate 64 for supporting thereon a plurality of electrical terminal blocks 65, each of which is connected by suitable electric wiring to a coil 18 of one of the electromagnets with the coils and terminal blocks being numbered so as to permit their association and identification. The tray slides 63 are received in sliding relation in parallel guide formations 66 which are in the form of downwardly and inwardly opening angle members and which are mounted on a transverse plate 67 extending between the vertical wall plates 14 and 14' of the conveyor frame. The tray 60', which is of the same construction, is arranged on the opposite side of the conveyor frame and receives terminal blocks 65'. The two sets of terminal blocks 65 and 65' are connected with opposite sides of the electromagnetic coils 18. This arrangement for supporting the terminal blocks 65 and 65' permits ready access to or exposure of the terminal blocks by merely sliding the trays on which the blocks are mounted laterally of the conveyor frame and eliminates any need for disturbing any of the other conveyor elements when checking or wiring of the magnets is required. It also leaves the top of the frame free for supporting other structures thereon.

In assembling a number of the rail units 10 on the cross bar supports 11 and 12 an arrangement is provided for leveling the individual rail units. Combination leveling and fastening devices 70 are provided at opposite sides adjacent each end of the conveyor frame as shown in FIGURES 5 and 6. The leveling and fastening devices 70 are identical and only one will be described. Referring to FIGURE 6, each of the leveling and fastening devices 70 comprises a bracket member 71 having a threaded aperture 72 which receives a machine screw 73 which may be turned down in the bracket so as to have its end 74 bear against the top surface 75 of the supporting cross member. The screw 73 is provided with an axial bore 76 which accommodates a fastening bolt 77 with a lock washer 78. The fastening bolt 77 has its threaded end seated in a threaded aperture 79 in the supporting cross bar. With this arrangement each of the frame units 10 may be leveled and fastened to the cross bars at four points so as to facilitate the alignment of the rails, particularly, when a number of rails are assembled in a single conveyor.

The multi-unit conveyor which is illustrated in FIGURES 1 and 2 of the drawings comprises four rail units 10A, 10B, 10C and 10D (FIGURES 10 and 11). The two center rail units 10A and 10B are mounted in fixed relation on the cross rails 11 and 12. The two outside rail units 10C and 10D are mounted in parallel relation with the center rails 10A and 10B but on an adjusting mechanism which permits these rails to be moved laterally of the center of the conveyor for adjustment relative to the fixed central rails. The cross rail 12 as shown in FIGURES 10 to 13 comprises an outer housing 80 which is of rectangular cross section and provided with a longitudinally extending slot 81 in the top wall thereof. A center bearing forming member 82 has a top portion 83 extending through the slot 81 on which the two center conveyors 10A and 10B are mounted. The member 82 is secured by a set screw 84 in fixed relation in the housing 80 and provided with a hollow section 85 for accommodating a shaft 86 which extends through the housing 80 and is journaled at opposite ends in bearing members 87 and 87'. The ends of the shaft 86 which extend at opposite ends of the center member 82 are threaded right and left hand and a pair of traveling nuts 88 and 89 are mounted therein to which the outside conveyor units 10C and 10D are secured by means of mounting blocks 90 and 91. The shaft 86 is provided at its end with a handle member 92 for turning the same so as to move the two outside conveyor units toward and from the center of the conveyor.

The end support shafts in the cross bars 11 and 12 at opposite ends of the conveyor may be provided with sprockets (not shown) connected by a chain so as to provide for simultaneous movement of opposite ends of each of the movable rail units.

While particular material and specific details of construction are referred to in describing the illustrated forms of the conveyor, it will be understood that other materials and different structural details may be resorted to within the spirit of the invention.

I claim:

1. In a rail type electromagnetic conveyor having an elongate mounting frame comprising laterally spaced side frame plates, a downwardly facing channel-shaped housing between the side frame plates, a plurality of electromagnets mounted in depending longitudinally spaced relation in said housing, downwardly facing belt supporting and guiding members mounted in the bottom face of said housing, said side plates and said belt supporting and guiding members having the bottom surfaces thereof bowed downwardly toward the center of said mounting frame to provide belt guideways which conform to predetermined belt sag, a pair of parallel endless belts mounted on end supports at the opposite ends of said mounting frame and having their lower runs traveling in said belt guideways, said supports at one end of the mounting frame comprising a separate pulley housing for each of said belts, a pulley mounted on a cross shaft in each said housing, an elongate hollow mounting member of rectangular cross section extending from each said pulley housing into the end of said mounting frame, an elongate guideway forming housing in the end of said mounting frame for receiving each of said hollow mounting members in sliding telescoped relation, a coil spring housed within each of said mounting members, a tension adjusting bolt positioned in axial alignment with each said spring and having one end connected to the innermost end of each said spring, cross bar members arranged in spaced longitudinal relation at the inner end of said guideway within said mounting frame and above said magnet housing, said cross bar members being apertured to slidingly receive the free end of each of said bolts, said bolts each having its free end threaded and provided with an adjusting nut which is positioned so as to abut the outwardly facing side of one of said cross bar members, and said guideway forming housing and its associated spring and tension adjusting bolt having the long axis thereof extending substantially parallel with the adjacent end portion of the bottom surface of said belt guideways so that the spring urges the end pulley in a direction to exert an upward pull on the belt and to hold the same in the belt guideway.

2. An electromagnetic conveyor having an elongate mounting frame comprising vertically disposed, laterally spaced parallel side plates, a plurality of electromagnets mounted in said frame in longitudinally spaced relation, means forming downwardly facing belt guideways in the bottom of said mounting frame, endless traveling belts carried on end pulleys mounted at opposite ends of said mounting frame and having the bottom runs thereof traveling in said guideways for advancing sheet materials held against the exposed faces of said bottom belt runs by the pull of the electromagnets, a horizontally extending cross beam having threaded vertical bores spaced laterally therein for supporting each end of said mounting frame and a leveling means for said mounting frame which comprises a pair of brackets extending laterally of the outside bottom margins of said side plates above the cross beam and having threaded vertical bores therein, said leveling means comprising a tube section having external threads engaged in screw threaded relation in a threaded vertical bore in each of said brackets and having its bottom end positioned to engage the top surface of said cross beam when said tube section is rotated to project the bottom end below the bottom face of the bracket in which it is mounted, and a fastening bolt extending through said tube section with its end in threaded engagement in a vertical bore in said cross beam.

3. A magnetic conveyor assembly comprising a plurality of elongate magnetic rail units, said units being disposed in parallel relation and each having endless traveling belts and electromagnets exerting a pull through bottom runs of said belts so as to convey sheet materials by holding the same in engagement with the exposed bottom faces of said belts, a cross support assembly at each end of said rail units which comprises an elongate hollow support member having a slot in the upper face thereof, means for holding certain of said rail units in parallel laterally spaced fixed position on the center portion of said support assembly, a threaded cross shaft journaled for rotation in said hollow support member with right and left hand threads at the opposite ends thereof, traveling nuts on the ends of said cross shaft having portions extending through said slot, and means including a rotatable member to secure the end of a rail unit to each of said nuts, which rail securing means is adjustable to enable the end of the rail unit to be adjusted toward and from the associated nut thereby to permit lateral and vertical adjustment of said rail units by rotation of said cross shaft and said rotatable securing members.

4. A magnetic conveyor comprising a plurality of magnetic rail units, each of which is characterized by an elongate frame having traveling belts supported on end pulleys mounted on the ends of the frame and electromagnets disposed in longitudinally spaced relation in the frame for holding metal sheets against the exposed faces of the bottom runs of said belts by magnetic force, said rail units being disposed in side-by-side parallel relation with outside rail units laterally adjustable relative to a fixed inside rail unit, horizontally disposed cross bar assemblies beneath opposite ends of the rail units for supporting the units, each said cross bar assembly comprising a housing and a cross shaft rotatably mounted therein, said cross shaft having oppositely threaded end sections, traveling nuts on said cross shaft end sections, and means for securing an outside rail unit in vertically adjustable relation, on each said nut, whereby the outside rail units may be adjusted individually in a vertical direction and simultaneously in a lateral direction relative to the inside rail unit.

References Cited by the Examiner

UNITED STATES PATENTS

| 880,303 | 2/08 | Hetherington | 198—208 X |
|---|---|---|---|
| 1,014,132 | 1/12 | Diplock. | |
| 1,077,339 | 11/13 | Farrell. | |
| 1,415,869 | 5/22 | Fischer. | |
| 2,340,797 | 2/44 | Cummings et al. | 198—41 |
| 2,486,733 | 11/49 | Buccicone | 198—41 |
| 2,600,475 | 6/52 | Buccicone | 198—41 |
| 2,612,988 | 10/52 | Andrews | 198—208 |
| 2,677,456 | 5/54 | McCann | 198—208 X |
| 2,817,933 | 12/57 | Bell et al. | 198—170 X |
| 2,947,429 | 8/60 | Buccicone | 198—41 |
| 2,953,238 | 9/60 | Buccicone | 198—41 |
| 3,036,146 | 5/62 | Kamen | 174—52.1 X |

OTHER REFERENCES

Booklet by Bucciconi Engineering Company, copyright date of 1953, received in the Patent Office July 22, 1953; 11 pp., pp. 9 and 10 relied on.

SAMUEL F. COLEMAN, *Primary Examiner.*

WILLIAM B. LA BORDE, *Examiner.*